United States Patent
Weidenhaupt et al.

(10) Patent No.: US 11,292,903 B2
(45) Date of Patent: Apr. 5, 2022

(54) RUBBER MIXTURES CONTAINING SULFUR-CONTAINING ORGANOSILICON COMPOUNDS

(71) Applicant: LANXESS DEUTSCHLAND GMBH, Cologne (DE)

(72) Inventors: Hermann-Josef Weidenhaupt, Pulheim (DE); Irene Moll, Neuss (DE)

(73) Assignee: LANXESS Deutschland GmbH, Cologne (DE)

( * ) Notice: Subject to any disclaimer, the term of this patent is extended or adjusted under 35 U.S.C. 154(b) by 339 days.

(21) Appl. No.: 16/612,957

(22) PCT Filed: May 11, 2018

(86) PCT No.: PCT/EP2018/062247
§ 371 (c)(1),
(2) Date: Nov. 12, 2019

(87) PCT Pub. No.: WO2018/206787
PCT Pub. Date: Nov. 15, 2018

(65) Prior Publication Data
US 2020/0181382 A1    Jun. 11, 2020

(30) Foreign Application Priority Data

May 12, 2017  (EP) ..................... 17170897

(51) Int. Cl.
| | | |
|---|---|---|
| C08L 23/22 | (2006.01) | |
| B60C 1/00 | (2006.01) | |
| C08K 3/36 | (2006.01) | |
| C08K 5/31 | (2006.01) | |
| C08K 5/548 | (2006.01) | |
| C08L 9/06 | (2006.01) | |

(52) U.S. Cl.
CPC .............. *C08L 23/22* (2013.01); *B60C 1/00* (2013.01); *C08K 3/36* (2013.01); *C08K 5/31* (2013.01); *C08K 5/548* (2013.01); *C08L 9/06* (2013.01)

(58) Field of Classification Search
None
See application file for complete search history.

(56) References Cited

U.S. PATENT DOCUMENTS

| | | | | |
|---|---|---|---|---|
| 3,798,196 A | * | 3/1974 | Rocktaschel et al. | C07F 7/10 523/213 |
| 3,842,111 A | * | 10/1974 | Meyer-Simon et al. | C08K 5/548 556/428 |
| 3,873,489 A | * | 3/1975 | Thurn | C07F 7/1804 524/262 |
| 5,409,969 A | * | 4/1995 | Hamada | B60C 1/0016 523/213 |
| 5,650,457 A | * | 7/1997 | Scholl | C08K 5/548 524/262 |
| 6,053,226 A | * | 4/2000 | Agostini | B60C 19/08 152/209.4 |
| 2011/0112215 A1 | * | 5/2011 | Kojima | C08L 9/00 523/158 |
| 2015/0240053 A1 | * | 8/2015 | Feldhude | C08K 5/548 524/262 |
| 2020/0181382 A1 | * | 6/2020 | Weidenhaupt | C08K 5/31 |

FOREIGN PATENT DOCUMENTS

EP       0941872 A2 *    9/1999    .............. C08K 9/06

OTHER PUBLICATIONS

Influence of Silica Polymer bond Microstructure on Tire Performance Indicators, Cichomski et al., Nov. 26, 2014, KHK 11th Fall Rubber Colloquium. (Year: 2014).*
KGK (2015), 68 (4), 38-45 Noordermeer et al.
The Chemistry of Organic Polysulfanes, Chem. Rev., 2002, 102, 3905-3945—cf. Ralf Steudel.
International Search Report—PCT/EP2018/062247—dated Jul. 10, 2018.

* cited by examiner

*Primary Examiner* — Peter A Salamon
(74) *Attorney, Agent, or Firm* — Nicanor A. Kohncke; Christopher L. McDavid; Ewa M. Wozniak

(57) ABSTRACT

Rubber mixtures containing at least one rubber, at least one filler and at least one compound of formula

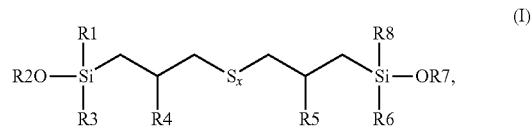

wherein
R1, R3, R6 and R8 are identical or different and represent methyl or ethyl,
R4 and R5 are identical or different and represent methyl or ethyl,
R2 and R7 are identical or different and represent methyl or ethyl and
x=4,
and the vulcanizates obtainable therefrom and moldings containing said vulcanizates. The latter feature high strength and breaking elongation, low rolling resistance and good wet grip as well as low emission of VOC during production.

13 Claims, No Drawings

RUBBER MIXTURES CONTAINING SULFUR-CONTAINING ORGANOSILICON COMPOUNDS

The present invention relates to rubber mixtures containing sulfur-containing organosilicon compounds and to the use of organosilicon compounds for producing these rubber mixtures, to vulcanizates and molded articles obtainable from these rubber mixtures, in particular tires having a low rolling resistance, good wet grip and low emissions of volatile organic components (VOC) during production.

BACKGROUND

Sulfur-containing organosilicon compounds which may be employed as reinforcing additives in rubber mixtures are known. Thus, DE2141159, DE2141160 and DE2255577 describe organosilanes as reinforcing additives in particular for silica-containing rubber vulcanizates for tire applications. The structures described in the examples derive from triethoxysilylpropyltetrasulfide (TESPT). DE2035778 discloses organosilane-based reinforcing additives. In the recited patent applications all examples derive from trialkoxysilylpropyl starting compounds. The disadvantage of these compounds is that the hysteresis losses are reduced not only at high temperatures (about 60° C., correlating with rolling resistance) but also at low temperatures (0° C.). However it is known that a low hysteresis at low temperatures (0 to 20° C.) is associated with a poor wet skid resistance in motor vehicle tires.

EP447066 likewise describes the use of such trialkoxysilylpropylpolysulfide-based organosilanes for producing tire treads that are silica-filled to a large extent. The rolling resistance of the tire was successfully reduced by combination of a special silane-modified rubber, silica filler and organosilane. The representatives recited as being suitable have alkyl bridges (—$CH_2CH_2$—). In these tire mixtures too it has been found that the recited chemicals not only reduce rolling resistance but also reduce wet grip.

EP0680997 discloses the use of bis(dimethylethoxysilylmethylene)polysulfide as a reinforcing additive for rubber mixtures having good rolling resistance and wet grip. Disadvantages here are the raw materials not hitherto available on a large industrial scale, which must be produced via a photochlorination, and also a significant deterioration of the performance properties such as strength, breaking elongation and hardness.

In KGK (2015), 68(4), 38-45 Noordermeer et al. describe the use of different reinforcing additives such as bis(dimethylethoxysilylpropyl)tetrasulfide (DMESPT) and higher alkyl homologs such as for example bis(triethoxysilyldecanyl)tetrasulfide (TESDeT). In the recited examples, compared to TESPT, DMESPT reduces hysteresis in the low temperature range, thus resulting in a reduction in wet grip. In addition, using DMESPT reduces the complete vulcanization time T95 by about 70% compared to TESPT which, in particular in the vulcanization of molded articles consisting of different rubber mixtures, for example tires, results in significant problems due to the different vulcanization rates. In a further example TESDeT is compared with TESPT and advantages in wet grip and also in terms of rolling resistance are apparent at longer carbon chain lengths. Cited as a great disadvantage of TESDeT is the high molecular weight which means that for equimolar use markedly greater amounts must be employed compared to TESPT. In addition, typically six molecules of ethanol are eliminated per molecule of TESDeT and emissions of VOC are therefore three times as high.

It is thus an object of the present invention to provide novel sulfur-containing organosilicon compounds, and rubber mixtures containing said compounds, which avoid the abovementioned disadvantages of the prior art.

It is now been found that, surprisingly, sulfur-containing organosilicon compounds which each have a propylene group branched in the 2-position as a spacer between the silicon atoms and the sulfur atoms exhibit in rubber mixtures an advantageous complete vulcanization time T95 falling between DMESPT and TESPT and result in vulcanizates having advantageous temperature-dependent hysteresis properties, with performance properties such as strength and breaking elongation also being positively affected.

The present invention therefore provides rubber mixtures containing at least one rubber, at least one filler and at least one compound of formula (I)

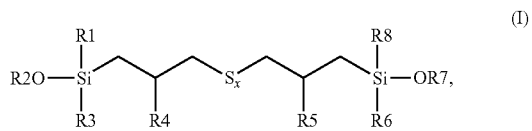

wherein
R1, R3, R6 and R8 are identical or different and represent methyl or ethyl, preferably methyl,
R4 and R5 are identical or different and represent methyl or ethyl, preferably methyl,
R2 and R7 are identical or different and represent methyl or ethyl, preferably ethyl, and
x=4.

Compounds of formula (I) wherein R2 and R7 represent ethyl are preferred.

Compounds of formula (I) wherein R1, R3, R6 and R8 represent methyl and R2 and R7 represent ethyl are particularly preferred.

Compounds of formula (I) wherein R1, R3, R6 and R8 represent methyl, R4 and R5 represent methyl and R2 and R7 represent ethyl are most preferred.

Production of the compounds of formula (I) may be effected by reaction of mercapto-containing silanes with disulfur dichloride with elimination of HCl. The reaction is performed in a manner known per se at temperatures of −30 to +80° C., optionally in the presence of solvents, such as alcohols or aromatic hydrocarbons:

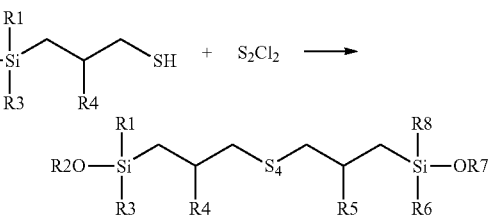

wherein R1 to R8 are as defined above.

For performance of the reaction reference is made to Houben-Weyl, Methoden der organischen Chemie, volume 9, page 88 ff. (1955) and volume E 11 (1985), Thieme Verlag, Stuttgart.

In particularly advantageous fashion the production of the compounds of formula (I) is achieved by reaction of haloalkylsilyl ethers and polyhalides with metal polysulfides in the presence of alcoholic solvents at temperatures of −20 to +90° C.:

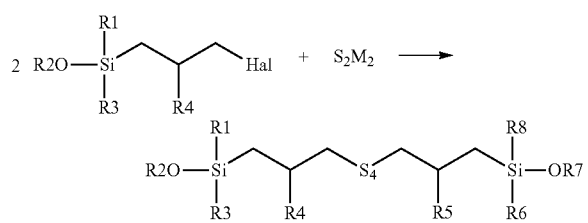

wherein R1 to R8 are as defined above and Hal represents halogen and M represents lithium, sodium or potassium.

Preferably employed as solvents are alcohols, such as methanol, ethanol, n-propanol, i-propanol, i-butanol, amyl alcohol, hexyl alcohol, n-octanol, i-octanol, ethylene glycol, 1,2- and 1,3-propylene glycol, 1,4-butanediol and/or 1,6-hexanediol.

The content of compounds of formula (I) in the rubber mixtures according to the invention is typically 0.1 to 15 phr, preferably 1 to 12 phr, particularly preferably 2 to 10 phr and very particularly preferably 3 to 8 phr. The unit phr relates to parts by weight per 100 parts by weight of rubber.

The compounds of formula (I) may be used individually or else together with other reinforcing additives.

The compounds of formula (I) may be added to the rubber mixtures in pure form or else absorbed on an inert organic or inorganic carrier. Suitable carrier materials are in particular silicas, natural or synthetic silicates, aluminum oxide and carbon blacks.

Preferably used as fillers are hydroxyl-containing oxidic fillers, for example
   silicas produced for example by precipitation of solutions of silicates or flame hydrolysis of silicon halides having specific surface areas of 5 to 1000, preferably 20 to 400, m²/g (BET surface area) and having primary particle sizes of 100 to 400 nm. The silicas may optionally also be in the form of mixed oxides with other metal oxides, such as oxides of Al, Mg, Ca, Ba, Zn, Zr, Ti.
   synthetic silicates, such as aluminum silicate, alkaline earth metal silicates such as magnesium silicate or calcium silicate, having BET surface areas of 20 to 400 m/g and primary particle diameters of 10 to 400 nm.
   natural silicates, such as kaolin and other naturally occurring silicas.
   glass fibers and glass fiber products (mats, strands) or microspheres.

It is preferable to employ silicas produced by precipitation of solutions of silicates having BET surface areas of 20 to 400 m²/g in amounts of 5 to 150 parts by weight based on 100 parts by weight of rubber together with the inventive reinforcing additives (I).

In the rubber mixture the weight fraction of hydroxyl-containing oxidic fillers is at least 10%, preferably at least 20%, particularly preferably at least 50% and most preferably at least 80% of the total filler content.

Carbon blacks may also be used as fillers. The carbon blacks to be used here are produced by the lamp-black, furnace-black or gas-black process and have BET surface areas of 20 to 200 m²/g, for example SAF, ISAF, IISAF, HAF, FEF or GPF carbon blacks. It is particularly preferable when the carbon blacks are used together with silicas.

The content of fillers in the rubber mixtures is typically from 10 to 170 phr, preferably 30 to 130 phr, and particularly preferably 50 to 110 phr.

In a very particularly preferred embodiment of the process 10 to 150 parts of silicas, optionally together with 0 to 20 parts by weight of carbon black, and 1.5 to 10 parts by weight of compounds of formula (I) in each case based on the employed rubber are used for producing the vulcanizates.

In a preferred embodiment the rubber mixtures additionally contain one or more crosslinkers.

In a preferred embodiment the rubber mixtures according to the invention also contain one or more crosslinkers. Suitable therefor are in particular sulfur-based crosslinkers, magnesium oxide and/or zinc oxide, and also peroxidic crosslinkers, particular preference being given to sulfur-based crosslinkers.

Sulfur may be used as the crosslinker in elemental soluble or insoluble form or in the form of sulfur donors. Suitable sulfur donors are for example dithiodimorpholine (DTDM), 2-morpholinodithiobenzothiazole (MBSS), caprolactam disulfide, dipentamethylenethiuram tetrasulfide (DPTT) and tetramethylthiuram disulfide (TMTD).

Preferably employed peroxidic crosslinkers are bis(2,4-dichlorobenzyl) peroxide, dibenzoyl peroxide, bis(4-chlorobenzoyl) peroxide, 1,1-bis(tert-butylperoxy)-3,3,5-trimethylcyclohexane, tert-butyl perbenzoate, 2,2-bis(tert-butylperoxy)butane, 4,4-di-tert-butyl peroxynonyl valerate, dicumyl peroxide, 2,5-dimethyl-2,5-di(tert-butylperoxy) hexane, tert-butyl cumyl peroxide, 1,3-bis(tert-butylperoxyisopropyl)benzene, di-tert-butyl peroxide and 2,5-dimethyl-2,5-di(tert-butylperoxy)-3-hexyne.

In addition to these peroxidic crosslinkers it may be advantageous to use further additions which can help to increase the crosslinking yield: suitable therefor are for example triallyl isocyanurate, triallyl cyanurate, trimethylolpropane tri(meth)acrylate, triallyl trimellitate, ethylene glycol di(meth)acrylate, butanediol di(meth)acrylate, trimethylolpropane tri(meth)acrylate, zinc diacrylate, zinc dimethacrylate, 1,2-polybutadiene, and N,N'-m-phenylenedimaleimide.

In addition it is also possible to add the known vulcanization accelerators such as mercaptobenzothiazoles, mercaptosulfenamides, thiocarbamates, thiocarbonates and dithiophosphates as well as further sulfur donors such as dithiodicaprolactams, dithiodimorpholines and xanthogenates. Both the vulcanization accelerators and the crosslinking agents may be employed individually or in admixture with one another. It is particularly preferable to employ sulfur as the crosslinking agent. The crosslinking agents and the vulcanization accelerators are each employed in amounts of 0.1% to 10% by weight, preferably 0.2% to 5% by weight, based on the rubber employed in each case.

It is additionally preferable to add to the rubber mixtures according to the invention the rubber auxiliaries familiar to those skilled in the art, such as reaction accelerators, aging stabilizers, heat stabilizers, light stabilizers, ozone stabilizers, processing aids, plasticizers, tackifiers, blowing agents, dyes, pigments, waxes, extenders, organic acids, reaction retarders, metal oxides and activators such as triethanolamine, polyethylene glycol, hexanetriol.

The recited rubber auxiliaries are typically employed in the conventional amounts of 0.1 to 30 phr.

In respect of crosslinkers, vulcanization accelerators and rubber auxiliaries reference is made to the compounds recited in EP2897814 which may analogously find use in the present application.

Natural rubber and/or synthetic rubbers may be used for producing the rubber mixtures according to the invention. Preferred synthetic rubbers are for example
BR—polybutadiene
ABR—butadiene/$C_1$-$C_4$-alkyl acrylate copolymer
CR—polychloroprene
IR—polyisoprene
SBR—styrene/butadiene copolymers having styrene contents of 1-60%, preferably 20-50%, by weight
IIR—isobutylene/isoprene copolymers
NBR—butadiene/acrylonitrile copolymers having acrylonitrile contents of 5-60%, preferably 10-50%, by weight
HNBR—partially hydrogenated or fully hydrogenated NBR rubber
EPDM—ethylene/propylene/diene copolymers
and mixtures of two or more of these rubbers.

It is preferable when the rubber mixtures according to the invention contain at least one SBR rubber, preferably a functionalized SBR rubber, and optionally one or more BR rubbers.

Very particular preference is given to rubber mixtures having an SBR:BR weight ratio of 100:0 to 60:40.

In a further advantageous embodiment the rubber mixtures according to the invention further comprise at least one NR rubber.

The combination of silica as the filler and solution SBR and BR as the rubber is particularly advantageous for producing tread mixtures for tires.

In silica-based tire mixtures it is typical to employ diphenylguanidine (DPG) or structurally similar aromatic guanidines as secondary accelerators to allow targeted adjustment of the crosslinking rate and the mixture viscosity in the mixing process. However, a crucial negative feature when using DPG is that it liberates carcinogenic aniline during the vulcanization. It has now been found that, surprisingly, in the rubber mixtures according to the invention DPG may be substituted by Vulcuren or TBzTD (tetrabenzylthiuramdisulfide).

The present invention therefore also comprises essentially DPG-free rubber mixtures. This is to be understood as meaning rubber mixtures having a content of diphenylguanidine and/or substituted diphenylguanidines of not more than 0.4 phr, preferably not more than 0.2, more preferably less than 0.1 and very particularly preferably less than 0.01 phr. The unit phr refers to parts by weight based on 100 parts by weight of rubber used in the rubber mixture. In a preferred embodiment the essentially DPG-free rubber mixtures contain Vulcuren or TBzTD, particularly preferably Vulcuren.

The present invention further provides a process for producing rubber mixtures by mixing at least one rubber with at least one filler and at least one compound of formula (I). Said process is preferably effected at 60° C. to 200° C., particularly preferably at 90° C. to 180° C.

Said process typically employs 10 to 170 phr, preferably 30 to 130 phr and particularly preferably 50 to 110 phr of filler and 0.1 to 15 phr, preferably 1 to 12 phr, particularly preferably 2 to 10 phr and very particularly preferably 3 to 8 phr of compound of formula (I). The abovementioned additional fillers, crosslinkers, vulcanization accelerators, and rubber auxiliaries, preferably in the abovementioned amounts, may moreover be added in the mixing operation.

Since polysulfides can undergo rearrangement reactions at high temperatures (cf. Ralf Steudel, The Chemistry of Organic Polysulfanes, Chem. Rev., 2002, 102, 3905-3945) a process for producing the rubber mixtures according to the invention could also be carried out when compounds of formula (I) where x=2 are mixed with sulfur and rubber at a temperature of 100° C. to 200° C., preferably 130° C. to 180° C., to form in situ compounds of formula (I) where x=4 by incorporation of sulfur atoms.

Production of the rubber mixtures according to the invention is carried out in customary fashion in known mixing apparatuses, such as rollers, internal mixers and mixing extruders at melt temperatures of 60° C. to 200° C., preferably 100° C. to 200° C., and at shear rates of 1 to 1000 $sec^{-1}$.

The addition of the compounds of formula (I) and the addition of the fillers is preferably carried out in the first part of the mixing operation at melt temperatures of 60° C. to 200° C., preferably 100° C. to 200° C., and the recited shear rates. However, said addition may also be carried out in later parts of the mixing operation at lower temperatures (40° C. to 130° C., preferably 40° C. to 100° C.), for example together with sulfur and vulcanization accelerators.

The present invention further provides a process for the vulcanization of the rubber mixtures of the invention which is preferably carried out at melt temperatures of 100° C. to 200° C., particularly preferably at 130° C. to 180° C. In one preferred embodiment, the vulcanization takes place at a pressure of from 10 to 200 bar.

The present invention also comprises rubber vulcanizates obtainable by vulcanization of the rubber mixtures of the invention. These vulcanizates, especially when used in tires, have the advantages of an excellent profile of properties and an unexpectedly low rolling resistance.

The rubber vulcanizates according to the invention are suitable for producing molded articles having improved properties, for example for producing cable sheathings, hoses, drive belts, conveyor belts, roll coverings, tires, shoe soles, sealing rings, and damping elements, particularly preferably for producing tires.

The present invention further provides for the use of the compounds of formula (I) for producing rubber mixtures and vulcanizates thereof. It is preferable when the rubber mixtures at least contain at least one rubber, at least one filler and at least one compound of formula (I).

Determination of Properties of Rubber Mixture/Vulcanizates:

Rheometer (Vulcameter) Complete Vulcanization Time 170° C./t95:

The MDR (moving die rheometer) vulcanization profile and analytical data associated therewith are measured in an MDR 2000 Monsanto rheometer in accordance with ASTM D5289-95. The time at which 95% of the rubber has been crosslinked is determined as the complete vulcanization time. The selected temperature was 170° C.

Hardness Determination:

The hardness of the rubber mixture of the invention was determined by producing milled sheets of thickness 6 mm from the rubber mixture in accordance with formulations of Table 1. Specimens of diameter 35 mm were cut out of the milled sheets, and the Shore A hardness of these was determined by using a digital Shore hardness tester (Zwick GmbH & Co. KG, Ulm). The hardness of a rubber vulcanizate provides a first indication of its stiffness.

Tensile Test:

The tensile test serves to directly determine the load limits of an elastomer and is effected to DIN 53504. The increase in length at break is divided by the initial length to give breaking elongation. In addition, the force on attainment of particular elongation stages, usually 50%, 100%, 200% and 300%, is also determined and expressed as the strain value (tensile strength at the specified elongation of 300%, or 300 modulus).

Dyn. Damping:

Dynamic test methods are used to characterize the deformation behavior of elastomers under periodically changing loads. An externally applied stress changes the conformation of the polymer chain. The loss factor tan δ is determined indirectly by way of the ratio of the loss modulus G" to the storage modulus G'. The loss factor tan δ at 60° C. is associated with rolling resistance and should be as low as possible. The loss factor tan δ at 0° C. is associated with wet grip and should be as high as possible.

Abbreviations:

| Trade name | Description | Produced/marketed by |
|---|---|---|
| BUNA VSL 5025-2 HM | SBR | LANXESS Deutschland GmbH |
| BUNA CB 24 | BR | LANXESS Deutschland GmbH |
| VULKASIL S | silica | LANXESS Deutschland GmbH |
| ZINKWEISS ROTSIEGEL | zinc oxide | Grillo Zinkoxid GmbH |
| CORAX N 339 | carbon black | Degussa-Evonik GmbH |
| TUDALEN 1849-2 | mineral oil | Hansen&Rosenthal KG |
| VULKANOX 4020/LG | N-1,3-dimethylbutyl-N-phenyl-p-phenylenediamine | LANXESS Deutschland GmbH |
| VULKANOX HS/LG | oligomerized 2,2,4-trimethyl-1,2-dihydroquinoline | LANXESS Deutschland GmbH |
| ANTILUX 654 | Light-stabilizer wax | LANXESS Deutschland GmbH |
| TESPT (SI 69) | bis(triethoxysilyl-propyl)tetrasulfide | Evonik Industries |
| DMESPT | bis(dimethylethoxysilyl-propyl)-tetrasulfide | Gelest Inc., Morrisville, USA |
| DMESiBT | bis(dimethylethoxysilyl-isobutyl)-tetrasulfide | Gelest Inc., Morrisville, USA |
| VULKACIT D/C | 1,3-diphenylguanidine | LANXESS Deutschland GmbH |
| VULKACIT CZ/C | N-cyclohexyl-2-benzo-thiazole sulfenamide | LANXESS Deutschland GmbH |
| Rhenogran TBzTD-70 | tetrabenzylthiuram disulfide | LANXESS Deutschland GmbH |

EXAMPLES

The compounds of formula (I) were employed in rubber mixtures in equimolar amounts. To achieve a comparable crosslinking density which is crucial to the 300 modulus, breaking elongation and strength, in accordance with KGK (2015), 68(4), 38-45 a somewhat higher sulfur amount was metered in for the compounds where two of the ethoxy groups had been replaced by methyl groups (cf. DMESPT and DMESBT).

The mixtures were produced in a kneader at an internal temperature of 150° C. Sulfur and accelerator were subsequently mixed in on a roller at 50° C. To achieve vulcanization the mixtures were heated to 170° C. for 30 minutes in heatable presses.

The tests showed that the inventive compound (I) from example A results in substantially more advantageous vulcanizate performance properties than the comparative compounds (comp. 1 & 2). This is apparent from the dynamic damping at 60° C. (measured as the loss factor tan δ), which is correlated with the rolling resistance of a tire and for which lower values are advantageous. It is surprising that simultaneously the dynamic damping at 0° C. (measured as tan δ at 0° C.), which is correlated with wet grip, is higher for the inventive compound (I) from example A than for the two comparative examples. It is also surprising that one of the great disadvantages of the comparative substance DMESPT, namely the extremely short complete vulcanization time which results in compatibility problems in the production (vulcanization) of molded articles containing different rubber compositions, for example tires, can be markedly improved with the inventive compound.

| Formulation | Comp. 1 | Comp. 2 | A |
|---|---|---|---|
| VSL 5025-2 HM | 96 | 96 | 96 |
| Buna CB 24 | 30 | 30 | 30 |
| Vulkasil S | 80 | 80 | 80 |
| stearic acid | 1 | 1 | 1 |
| zinc oxide | 2.5 | 2.5 | 2.5 |
| Corax N 339 carbon black | 6.4 | 6.4 | 6.4 |
| Tudalen 1849-2 | 8 | 8 | 8 |
| Vulkanox HS/LG | 1 | 1 | 1 |
| Vulkanox 4020/LG | 1 | 1 | 1 |
| Antilux 654 | 1.5 | 1.5 | 1.5 |
| TESPT | 6.4 | — | — |
| DMESPT | — | 5.0 | — |
| DMESBT | — | — | 5.3 |
| On the roller/50 C: | | | |
| VULKACIT CZ/C | 1.5 | 1.5 | 1.5 |
| VULKACIT D/C | 2.0 | 2.0 | 2.0 |
| sulfur | 1.5 | 2.1 | 2.1 |
| Complete vulcanization time | | | |
| T95 (s) | 1144 | 326 | 550 |
| Mechanical properties: | | | |
| 300 modulus (MPa) | 16.0 | 15.9 | 15.3 |
| strength (MPa) | 19.8 | 20.7 | 20.8 |
| breaking elongation (%) | 358 | 374 | 385 |
| hardness (Shore A) | 66 | 67 | 67 |
| elasticity (60° C.) | 54 | 58 | 61 |
| tan δ (0° C.) | 0.392 | 0.404 | 0.418 |
| tan δ (60° C.) | 0.102 | 0.086 | 0.079 |

When using Vulcuren as a DPG replacement a lower mixture viscosity with improved scorch resistance (longer scorch time) was achieved after the final mixing stage (5-stage mixing process). The complete vulcanization time T95 remained unchanged by the substitution.

The profile of the mechanical properties of the compounds in terms of hardness, 300 modulus, breaking elongation and tensile strength remained largely unimpaired upon substitution of DPG by Vulcuren or TBzTD. In addition the vulcanizates crosslinked using Vulcuren and TBzTD have a better abrasion resistance.

The use of Vulcuren as a DPG replacement is advantageous compared to TBzTD in terms of mixture viscosity and complete vulcanization time (T 95).

| Formulation | 1 | 2 | 3 |
|---|---|---|---|
| Buna VSL 5025-2 HM | 96 | 96 | 96 |
| Buna CB 24 | 30 | 30 | 30 |
| Vulkasil S | 80 | 80 | 80 |
| stearic acid | 1 | 1 | 1 |
| zinc oxide | 2.5 | 2.5 | 2.5 |
| DMESiBT | 5.3 | 5.3 | 5.3 |
| Corax N 339 carbon black | 6.4 | 6.4 | 6.4 |
| Tudalen 1849-2 | 8 | 8 | 8 |
| Vulkanox HS/LG | 1 | 1 | 1 |

-continued

| Formulation | 1 | 2 | 3 |
|---|---|---|---|
| Vulkanox 4020/LG | 1 | 1 | 1 |
| Antilux 654 | 1.5 | 1.5 | 1.5 |
| On the roller/50 C: | | | |
| Vulkacit CZ/EGC | 1.5 | 1.5 | 1.5 |
| sulfur | 2.1 | 2.1 | 2.1 |
| VULKACIT D/C | 2.5 | — | — |
| Vulcuren | — | 0.4 | — |
| Rhenogran TBzTD-70 | — | — | 0.6 |
| Tests | | | |
| Mooney viscosity, ML1 + 4 (1st mixing stage) | 120.14 | 120.58 | 130.09 |
| Mooney viscosity, ML1 + 4 (5th mixing stage) | 87.12 | 85.91 | 93.2 |
| Scorch resistance (MS-T5) (s) | 782.6 | 1174.4 | 942 |
| Complete vulcanization time T95 (s) | 428.73 | 447.18 | 2209.8 |
| Mechanical properties: | | | |
| 300 modulus (MPa) | 14.6 | 14.9 | 15 |
| strength (MPa) | 24.2 | 24.5 | 22.8 |
| breaking elongation (%) | 453 | 456 | 424 |
| hardness (Shore A) | 68 | 68 | 68 |
| Abrasion (ISO 4649) (mm) | 76.7 | 64 | 62.7 |

What is claimed is:

1. A rubber mixture comprising
at least one rubber,
at least one filler and
at least one compound of formula (I)

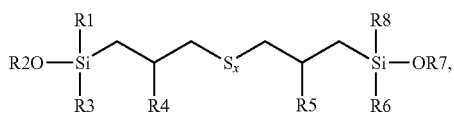

(I)

where
R1, R3, R6 and R8 are identical or different and represent methyl or ethyl,
R4 and R5 are identical or different and represent methyl or ethyl,
R2 and R7 are identical or different and represent methyl or ethyl and
x=4.

2. The rubber mixture as claimed in claim 1, wherein R2 and R7 represent ethyl.

3. The rubber mixture as claimed in claim 1, wherein R1, R3, R6 and R8 represent methyl.

4. The rubber mixture as claimed in claim 1, wherein R4 and R5 represent methyl.

5. The rubber mixture as claimed in claim 1, wherein the compounds of formula (I) is present in an amount of 0.1 to 15 phr.

6. The rubber mixture as claimed in claim 1, additionally containing at least one hydroxyl-containing oxidic filler.

7. The rubber mixture as claimed in claim 1, having a content of diphenylguanidine and/or substituted diphenylguanidines of not more than 0.4 phr.

8. The rubber mixture as claimed in claim 1, additionally containing one or more crosslinkers.

9. A process for producing the rubber mixture as claimed in claim 1, comprising mixing the at least one rubber, the filler and the compound of formula (I) with one another at a temperature of 60° C. to 200° C.

10. The process according to claim 9, wherein the mixing is performed with sulfur at a temperature of 100° C. to 200° C.

11. A process for producing rubber vulcanizates comprising vulcanizing the rubber mixture according to claim 1 at a temperature of 100° C. to 250° C.

12. A vulcanizate obtainable by the process of claim 11.

13. A rubber product comprising one or more rubber vulcanizates according to claim 12.

* * * * *